United States Patent
Lee et al.

(10) Patent No.: US 7,426,296 B2
(45) Date of Patent: Sep. 16, 2008

(54) HUMAN SKIN TONE DETECTION IN YCBCR SPACE

(75) Inventors: Hung-Ju Lee, Pleasanton, CA (US); Chuen-Chien Lee, Pleasanton, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 902 days.

(21) Appl. No.: 10/942,550

(22) Filed: Sep. 15, 2004

(65) Prior Publication Data

US 2005/0207643 A1 Sep. 22, 2005

Related U.S. Application Data

(60) Provisional application No. 60/554,532, filed on Mar. 18, 2004.

(51) Int. Cl.
*G06K 9/00* (2006.01)
*G06K 9/68* (2006.01)

(52) U.S. Cl. ........................ 382/165; 382/118

(58) Field of Classification Search ................ 382/103, 382/115, 118, 162, 164, 165, 167, 173, 218, 382/219, 243, 254, 272; 358/1.9, 504, 515, 358/518, 522, 538, 539; 345/589, 600–604; 348/169, 577, 625, 653, E9.04
See application file for complete search history.

(56) References Cited

U.S. PATENT DOCUMENTS

| | | | | |
|---|---|---|---|---|
| 5,638,136 | A * | 6/1997 | Kojima et al. | 348/653 |
| 6,067,399 | A | 5/2000 | Berger | |
| 6,343,141 | B1 * | 1/2002 | Okada et al. | 382/118 |
| 6,366,693 | B1 * | 4/2002 | Silverbrook et al. | 382/162 |
| 6,633,655 | B1 | 10/2003 | Hong et al. | |
| 6,661,907 | B2 | 12/2003 | Ho et al. | |
| 6,717,698 | B1 * | 4/2004 | Lee | 358/1.9 |
| 7,263,220 | B2 * | 8/2007 | Crandall et al. | 382/165 |
| 7,333,654 | B2 * | 2/2008 | Luo et al. | 382/165 |
| 7,348,992 | B2 * | 3/2008 | Kim et al. | 345/589 |
| 2002/0180893 | A1 | 12/2002 | Nicolas et al. | |
| 2003/0011612 | A1 | 1/2003 | Luo et al. | |
| 2003/0063300 | A1 | 4/2003 | Rubinstenn | |
| 2003/0065256 | A1 | 4/2003 | Rubinstenn | |

(Continued)

OTHER PUBLICATIONS

Author Unknown; Studies of Skin Colours at Different Spaces, Download from Internet, Aug. 2, 2004, Oulu University Library, pp. 1-3.

(Continued)

*Primary Examiner*—Amir Alavi
(74) *Attorney, Agent, or Firm*—John P. O'Banion (57) ABSTRACT

A method for detecting human skin tone in a video signal by comparing image data from the video signal to a color profile table obtained from a plurality of training sequences. The image data comprising a plurality of pixels each having a plurality of color components, the components preferably being in the YCbCr color space. The method includes separating image data for each frame in the video signal into sets of data, averaging the image data in each data set to generate mean values for each color component in the data set, comparing the mean values to a stored color profile correlating to human skin tone, and identifying data sets falling within the stored color profile.

47 Claims, 8 Drawing Sheets

U.S. PATENT DOCUMENTS

| | | | |
|---|---|---|---|
| 2003/0223622 A1* | 12/2003 | Simon et al. | 382/118 |
| 2004/0017938 A1 | 1/2004 | Cooper et al. | |
| 2004/0022435 A1 | 2/2004 | Ishida | |
| 2004/0052414 A1 | 3/2004 | Schroder | |
| 2005/0207643 A1* | 9/2005 | Lee et al. | 382/165 |
| 2007/0110305 A1* | 5/2007 | Corcoran et al. | 382/167 |

OTHER PUBLICATIONS

Author Unknown; Colour Based Detection, Localization and Tracking of Skin,, Download from Internet, Aug. 2, 2004, Oulu University Library, ps. 1-6.

Vezhnevets, V., et al.; A Survey on Pixel-Based Skin Color Detection Techniques, Graphics and Media Laaboratory, Date Unknown, Moscow State University, Moscow, Russia, ps. 1-8, 2004.

Singh, S.K., et al.; A Robust Skin Color Based Face Detection Algorithm, Tamkang Journal of Science and Engineering, 2003, vol. 6, No. r, pp. 227-234.

* cited by examiner

HUMAN SKIN TONE DETECTION IN YCBCR SPACE

CROSS-REFERENCE TO RELATED APPLICATIONS

This application claims priority from U.S. provisional application Ser. No. 60/554,532 filed on Mar. 18, 2004, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention pertains generally to skin tone detection systems and methods, and more particularly to skin tone detection systems and methods for digital video images in YCbCr space.

2. Description of Related Art

In order to minimize bandwidth for transmission and the amount of storage space in video applications, compression techniques are utilized to reduce the size of the video. These compression techniques generally have an adverse effect on the quality of the video image, such as texture loss and other artifacts.

Because facial regions receive a high degree of attention as opposed to other objects in the image, one way for increasing the quality of the image is to concentrate processing procedures on face regions.

There are various known approaches for detecting face regions in images. These include feature-based, motion-based and color-based approaches. Feature-based approaches try to identify a face region by detecting certain facial features, such as the eyes, the nose and the mouth. Motion-based approaches operate on the principle that a moving region in an image is likely to be a face. A color-based approach looks for skin-colored regions in an image.

Many of the known face detection approaches are computationally expensive, and are thus not ideal for real time applications such as digital video coding. The preferred approach for such applications is a color-based approach.

Color-based, or skin tone face detection involves extracting the regions of an image which have color corresponding to skin color. The skin tone detection system should be able to detect a range of skin tones, such as African, Asian and European, and should also be able to detect skin color irrespective of the lighting conditions under which the image is captured.

Accordingly, many known color-based face detection methods involve complex parametric modeling of the human skin tone. Such modeling requires a heavy computation cost, and while such computation costs may be acceptable in still image editing of JPEG or other still image files, they are prohibitive in current video standards (e.g., MPEG or H.263).

Accordingly, it is an object of the present invention to provide an improved skin tone detection algorithm for video images.

It is a further object of the present invention to provide a skin tone detection algorithm that has minimal computational costs and that improves the visual quality of video images by identifying human skin tone regions for further processing by a video encoder.

BRIEF SUMMARY OF THE INVENTION

An aspect of the invention is a method for detecting human skin tone in a video signal, the video signal comprising a plurality of frames each having image data. The method comprises separating the image data for each frame into sets of data, the image data comprising a plurality of pixels each having a plurality of color components, averaging the image data in each data set to generate mean values for each color component in the data set, comparing the mean values to a stored color profile, the color profile correlating to human skin tone, and identifying data sets falling within the stored color profile.

In a preferred mode, generating a mean value for each component comprises generating Y, Cb, and Cr components in YCbCr color space. However, the method may be performed in a variety of color spaces known in the art.

Generally, the image data is further subdivided into subsets, wherein each subset is averaged to generate mean values for each color component in the data subset. Preferably, the image data is divided into four subsets. In YCbCr space, each subset for the Cb and Cr components prefereably comprises a block of 4×4 pixels, and each subset for the Y component preferably comprises a block of 8×8 pixels.

According to a preferred embodiment, the mean values of each subset are compared to the stored color profile. Each subset may then be assigned a voting number identifying whether the subset falls within the stored color profile. The subsets may then be summed to form a data set voting number. The data set voting number is compared to a threshold number, and the data set is assigned to a skin tone candidate list when the data set voting number is greater than the threshold number.

In a preferred mode, the stored color profile comprises one or more color component ranges, wherein the color component ranges are acquired from a plurality of training sequences. Generally, each color component range comprises a maximum and minimum value for each of the Y, Cb, and Cr components.

In another aspect of the invention, the identified data sets are assigned to a skin tone candidate list. The candidate list may then be subjected to a number of additional refinement or processing steps, such as pixel based refinement, removal of data sets in the candidate list that are not bordering any other data sets are removed from the list, supplementing the candidate list with data sets surrounded by data sets assigned to the candidate list. The identified data sets are then typically subjected to further processing by a video encoder.

In another aspect of the invention, a method for detecting human skin tone in a video signal comprises acquiring image data from a plurality of training sequences, generating a color profile from the plurality of training sequences, the color profile comprising one or more sets of component ranges indicative of human skin tone, comparing image data from each frame to the color profile, and identifying data sets from each frame that fall within the skin tone component ranges.

The comparing step generally comprises separating the image data for each frame into sets of data, averaging the image data in each data set to generate mean values for each color component in the data set, and comparing the mean values of the data set against the color profile.

In yet another aspect of the invention, an apparatus for detecting human skin tone in a video signal comprises means for partitioning the image data from the video signal into a plurality of macroblocks, means for averaging at least a portion of the data in each macroblock to generate mean values for each color component; and means for comparing the mean values to a stored color profile to identify macroblocks falling within the color profile, the color profile correlating to human skin tone Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the systems and methods generally shown in FIG. 1A through FIG. 8. It will be appreciated that the methods may vary as to configuration and as to details of the parts, and that the methods may vary as to the specific steps and sequence, without departing from the basic concepts as disclosed herein.

With the advent of computer graphics and video signal transmission standards, a number of "color spaces" have evolved to represent the color spectrum. For example, RGB, YCbCr, HSI, YIQ, YES, YUV, etc. are all different standards developed to model the color spectrum. Because YCbCr has been widely adopted for use in digital video, the following description will be directed to skin tone recognition techniques in YCbCr space. However, it is appreciated that the following description may be applied for any color space commonly known in the art.

Figure 1A:
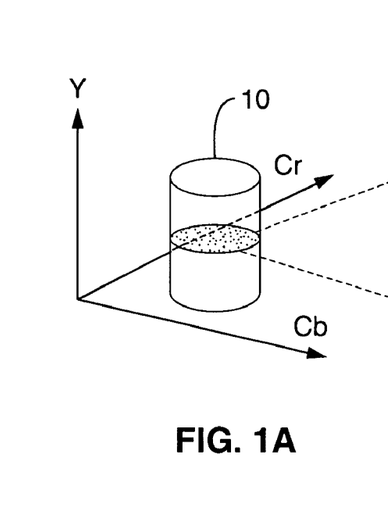
FIG. 1A is a three dimensional representation of a skin tone region in YCbCr space.

Referring now to FIGS. 1A-2C, YCbCr space comprises three components: a luminance component, Y; and two crominance components, Cb and Cr. The range of human skin tone in YCbCr space may be modeled as a three-dimensional space 10, as shown in FIG. 1A. However, parametrically modeling this complex human skin tone in these YCbCr three-dimensional spaces requires a heavy computation cost, resulting in unrealistic implementation for multi-media application imposed by real-time video coding constraint.

Figure 3:
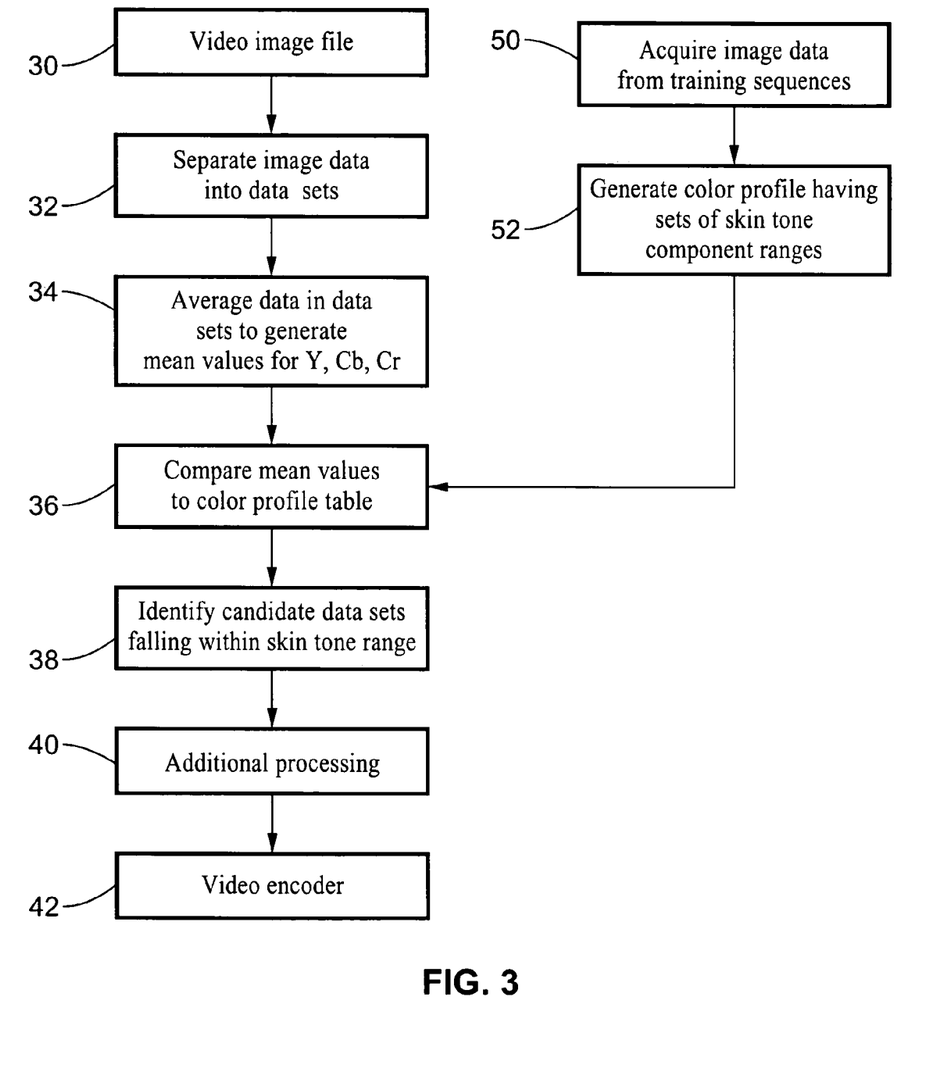
FIG. 3 illustrates a preferred method of detecting skin tone in a video signal.

To allow for skin tone detection in real-time applications without losing its merit, the present invention uses a simple skin-tone profile table to represent the Y, Cb and Cr values for human skin tone. As illustrated in FIG. 3, a series of video/image training sequences are acquired, shown as block 50. From the training sequences, a color profile is generated to identify the range of Y, Cb and Cr components that correspond to the human skin tone, shown as block 52. The training sequences include a variety of skin tones correlating to African, Asian and European, etc. features. The training sequences also represent a variety of the lighting conditions under which the image is captured.

Figure 1B:
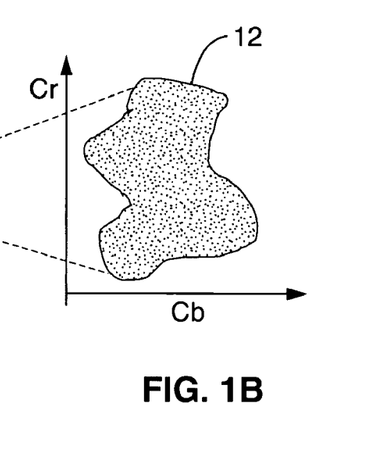
FIG. 1B is a segment of the skin tone region of FIG. 1A in the CrCb plane.

Referring now to FIG. 1B, the range of skin tone in YCbCr space may be broken down to a two-dimensional region 12 in CbCr space for a particular Y value. The area inside region 12 represents the skin tone as defined by the training sequences, while the region outside region 12 is not skin tone.

Figure 2A:
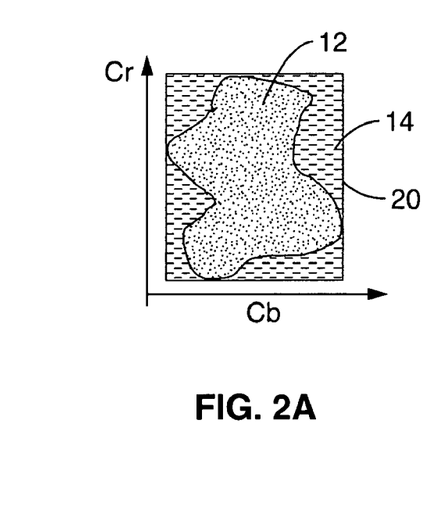
FIG. 2A is the region of FIG. 1B with a bounding box enclosing the entire two dimensional skin tone region.

FIG. 2A shows a rectangular bounding box 20 that includes the entire skin tone region 12, but is over-inclusive and spans over non-skin tone regions 14 as well. However, if the color profile uses box 20, the result would be detection of non-skin tone colors, or false alarms.

Figure 2B:
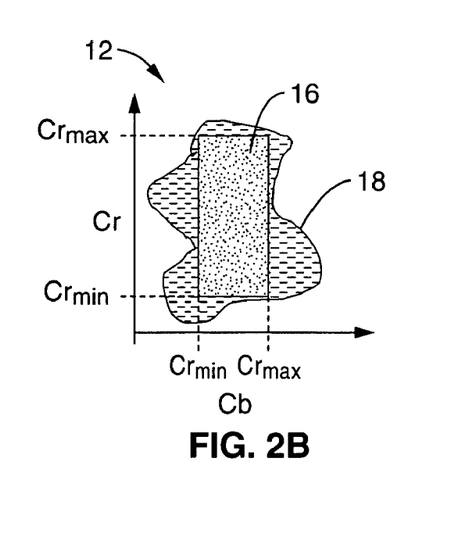
FIG. 2B is the region of FIG. 1B with a maximum bounding box inside two dimensional skin tone region.

FIG. 2B illustrates a maximum bounding box 16 inside the skin tone area 12, corresponding to the area inside $Cb_{min}$, $Cb_{max}$, $Cr_{min}$, and $Cr_{max}$. However, box 16 is under-inclusive, resulting in detection failure of skin tone regions 18.

Figure 2C:
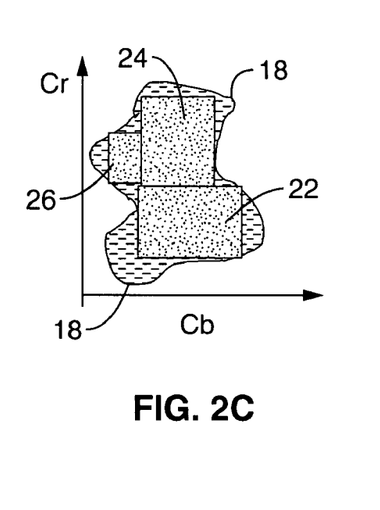
FIG. 2C is the region of FIG. 1B with a number of bounding boxes inside the two dimensional skin tone region.

FIG. 2C illustrates the use of a number of bounding boxes, 22, 24, and 26, to define skin tone region 12. This approach covers a larger area of skin tone with a smaller portion of detection failure by specifying the location of a plurality of rectangular areas in YCbCr space. The larger the number of bounding boxes, or entries in the table, the greater the coverage, with less detection failures. Any number of entries may be used, however, the greater accuracy associated with larger amounts of entries must be weighted against the larger computation costs as a result of the number of entries.

In each entry of the skin tone profile table, six elements are included to specify the range of pixel values in YCbCr space. Each entry has a Max and Min for each of the Y, Cb and Cr components. Once the entries are compiled, the profile table may be stored for later lookup to compare actual video component values to the profile table. The following is an exemplary skin tone profile table having 8 entries:

| | SkinToneProfile[_MAX_PROFILE_ENTRY_][6] = { | | | | | |
|---|---|---|---|---|---|---|
| // | MaxY | MinY | MaxCb | MinCb | MaxCr | MinCr |
| | 120, | 70, | 119, | 113, | 142, | 151, |
| | 120, | 70, | 112, | 104, | 157, | 145, |
| | 120, | 70, | 110, | 97, | 160, | 146, |
| | 117, | 81, | 123, | 120, | 137, | 132, |
| | 115, | 95, | 115, | 110, | 149, | 146, |
| | 106, | 69, | 122, | 116, | 149, | 137, |

-continued

```
       SkinToneProfile[_MAX_PROFILE_ENTRY_][6] = {
//   MaxY   MinY   MaxCb   MinCb   MaxCr   MinCr
     115,    82,    120,    116,    143,    138,
     120,    70,    118,    112,    151,    143,};
```

Referring again to FIG. 3, the video image data 30 is compared against the generated color profile 52. The video image generally comprises a sequence of frames of image data. Each frame is displayed as a two-dimensional array of pixels. In order to minimize bandwidth for transmission and the amount of storage space, compression techniques are utilized to reduce the size of the video. Each frame is separated or divided into data sets or "macroblocks" of data (block 32). Each macroblock may be further subdivided into subsets, or sub blocks, illustrated as block 80 in FIG. 5. After the mean values are compared to the color profile table(block 36), candidate skin tone data sets may be identified (block 38) for additional processing (block 40).

Figure 4A:
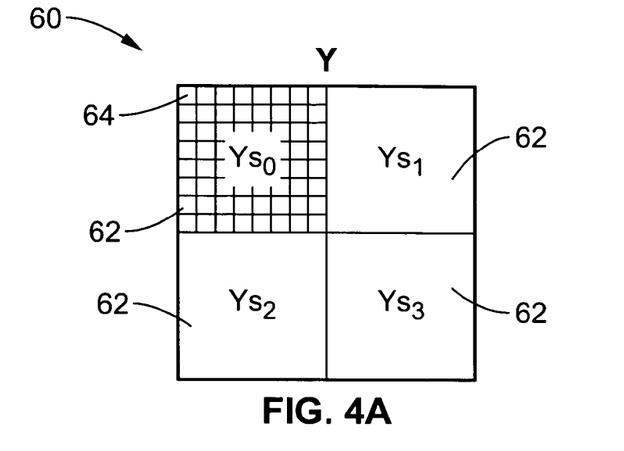
FIGS. 4A-4C illustrate subdivisions of Y, Cb, and Cr macroblocks.
Figure 4B:
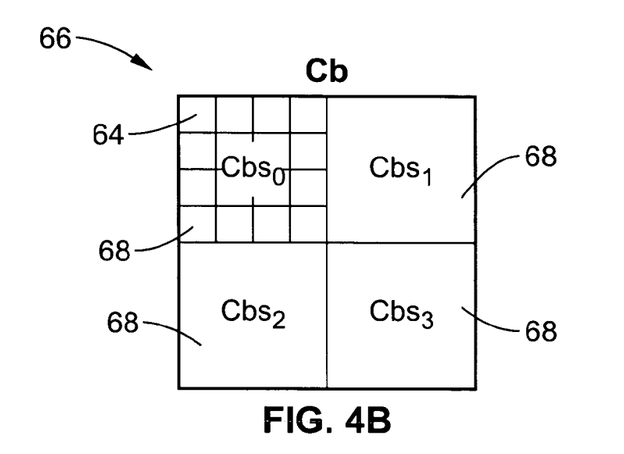
Figure 4C:
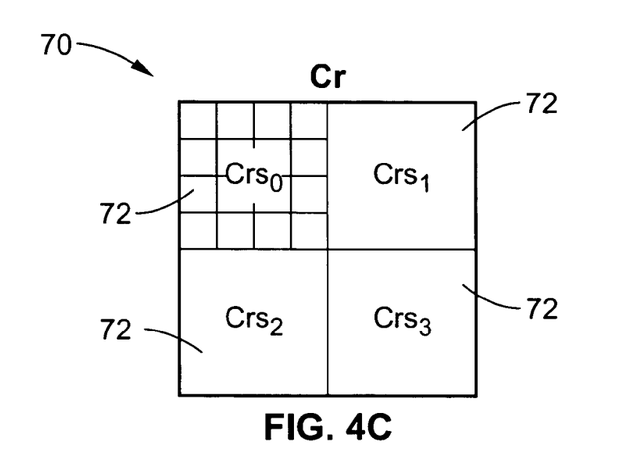

Referring now FIGS. 4A-4C, each macroblock is made up of respective Y, Cb and Cr component macroblocks which are further subdivided. Y macroblock 60 is subdivided into 4 sub-blocks 62. Similarly, Cb macroblock 66 is subdivided into 4 sub-blocks 68 ($Cb_0$, $Cb_1$, $Cb_2$, $Cb_3$), and Cr macroblock 70 is subdivided into 4 sub-blocks 72 ($Cr_0$, $Cr_1$, $Cr_2$, $Cr_3$). The Y macroblock preferably comprise a matrix of 16×16 pixels 64 (i.e., four 8×8 pixel blocks). The Cb and Cr comprise a matrix of 8×8 pixels 64 (i.e., four 4×4 pixel blocks). The human visual system has more receptors for the Y (luminance) component than the Cb and Cr (chrominance) components, therefore, the spatial resolution of the Cb and Cr components can be reduced without loss of quality.

Figure 5:
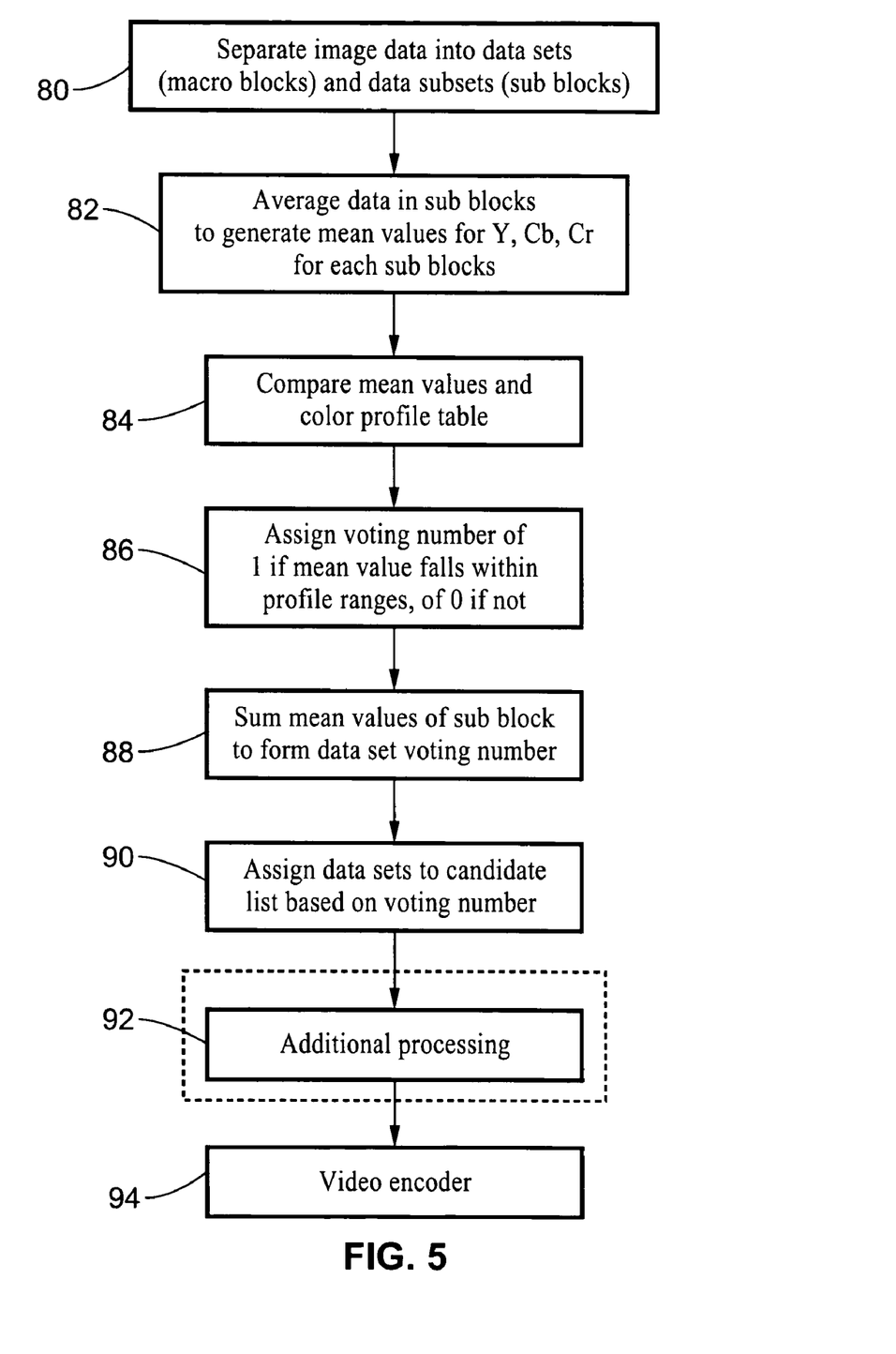
FIG. 5 shows another preferred embodiment of detecting skin tone in a video signal.

Referring again to FIG. 5 the pixels are averaged to generate four mean values ($Ys_0$, $Ys_1$, $Ys_2$, $Ys_3$) of the 8×8 Y sub clocks, four mean values of the 4×4 Cb sublocks ($Cb_0$, $Cb_1$, $Cb_2$, $Cb_3$), and four mean values of the Cr sub blocks, respectively, shown as block 82. The mean values are then checked against the profile table (block 84). Each sub block value is assigned a voting number equal to one if the value is within any of the component ranges of the color profile table, and if not assigned a value of zero (block 86). The mean values are then summed to for a data set or macroblock voting number, shown as block 88. If the macroblock sum is greater than a set threshold number (e.g. 2), the macroblock will be designated as a potential skin tone block and assigned to a candidate list, shown as block 90. The threshold number is an empirical value, and can be adjusted according to its applications and coding environment. For example, the threshold number may be adjusted to lower allow more macroblocks to be assigned to the candidate list, or adjusted higher to allow fewer macroblocks to be assigned to the candidate list. An exemplary algorithm may read as follows:

If (SkinToneRange(Y [0], Cb [0], Cr [0])
Vote1=1
Else
Vote1=0;
If (SkinToneRange(Y [0], Cb [0], Cr [0])
Vote2=1
Else
Vote2=0;
If (SkinToneRange(Y [0], Cb [0], Cr [0])
Vote3=1
Else
Vote3=0;
If (SkinToneRange(Y [0], Cb [0], Cr [0])
Vote4=1
Else
Vote4=0;
Vote=Vote1+Vote2+Vote3+Vote4
If Vote≧2 then $MB_0$ is classified as skin tone, else non-skin tone.

All of the macroblocks identified as skin tone are placed into candidate list shown as block 40 in FIG. 3 or block 90 in FIG. 5, and may either be subjected to further processing steps (block 40), or input into a video encoder (block 42).

The skin tone detection algorithm may also be refined to employ extra scrutiny for certain regions of the video frame. Generally, the center area of a picture attracts more attention of our vision system. To reduce computational cost; a region of interest (ROI) may be considered for extra skin tone detection. For example, we can shrink the ROI to be an n/mth of its height and width in unit of a macroblock from horizontal and vertical direction, where n<m, or just simply shrink one macroblock wide in four sides.

Figure 6:
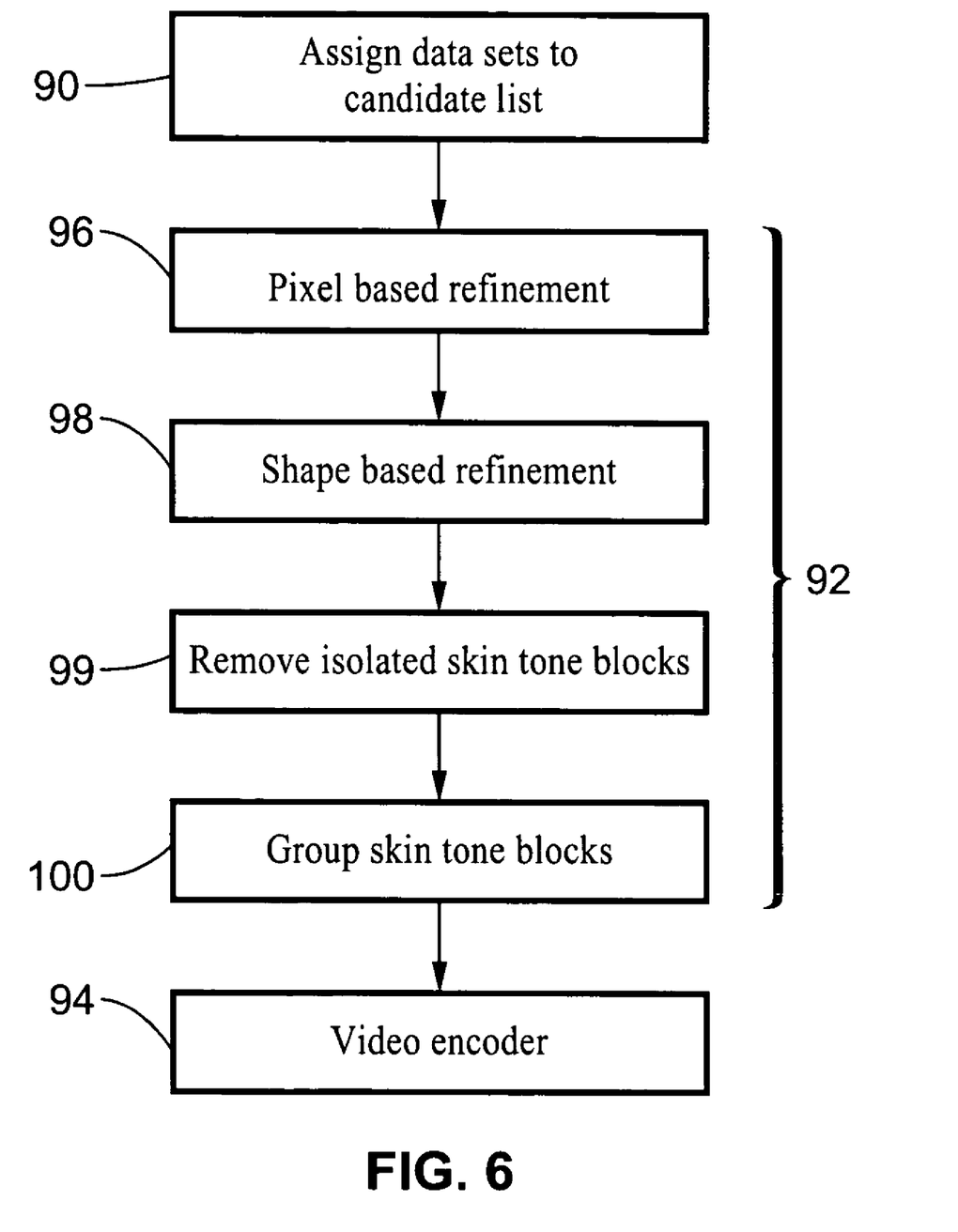
FIG. 6 illustrates additional refinement steps for of detecting skin tone in a digital video.

Now referring to FIG. 6, the candidate list may be further subjected to additional processing 92 by one or more steps. Any combination of the below mentioned processes may be used to refine the accuracy of the skin tone detection.

Figure 7:
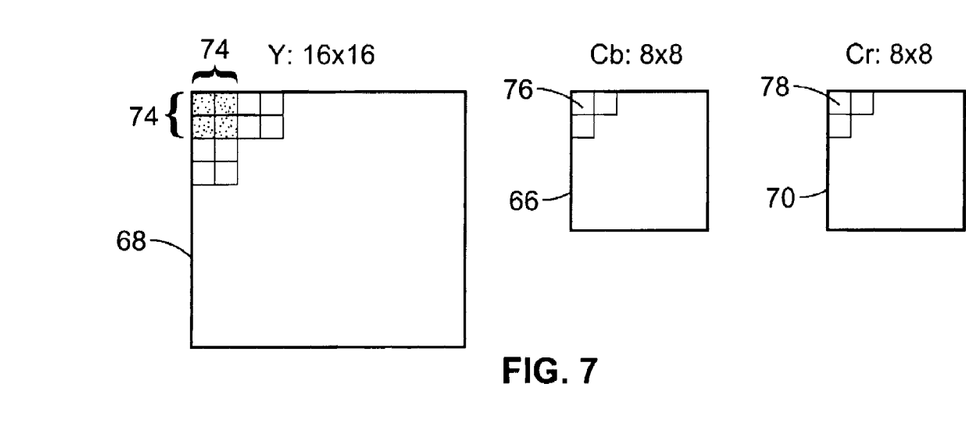
FIG. 7 illustrates a pixel based refinement process of the present invention.

One process that may be employed to improve the accuracy of the skin tone detection is pixel-based refinement of the candidate list, shown as block 96. For each skin tone macroblock in the candidate list, every pixel (16*16 pixels from Y, 8*8 pixels from Cb, and 8×8 pixels from Cr) is checked by calling the function SkinToneRange(Y_pixel, Cb_Pixel, and Cr_pixel). FIG. 7 shows the geometric positions where Y_pixel, Cb_pixel and Cr_pixel are chosen. The group of four pixels 74 in the Y macroblock 60 combine with pixel 76 in Cb and pixel 78 in Cr to form a pixel for checking. For example, SkinToneRange(topleft_purple_pixel_in_Y, purple_pixel_in_Cb, purple_pixel_in_Cr)
SkinToneRange(topright_purple_pixel_in_Y, purple_pixel_in_Cb, purple_pixel_in_Cr)
SkinToneRange(bottomleft_purple_pixel_in_Y, purple_pixel_in_Cb, purple_pixel_in_Cr)
SkinToneRange(bottomright_purple_pixel_in_Y, purple_pixel_in_Cb, purple_pixel_in_Cr)

If a pixel is in the range defined in the profile table, the pixel is called SkinTonePixel. The number of SkinTonePixels in the range is counted, and if the percentage of SkinTonePixels is larger than the threshold value (e.g., one third of the total pixels (i.e., 256 pixels) in a macroblock), then the macroblock remains in the skin tone candidate list. If the percentage of pixels is lower than the threshold, the macroblock is removed from the list.

One further improvement is to consider the shape (e.g., oval, rectangle) of continuous skin tone macroblocks, shown as block 98. For example, a thin strait region of skin tone macroblocks is unlikely a human face, and thus is removed from the candidate list.

The candidate list may further be refined based on the interrelationships between the macroblocks. For example, a single, isolated skin tone macroblock may be removed from the candidate list, shown as block 99. Because isolated macroblocks are unlikely to be part of a facial feature, the possibility of false alert is reduced. Generally, the four neighboring macroblocks (top, bottom, left and right) are examined. If none of the neighboring macroblocks are skin tone it is removed from the candidate list.

The final step of detection is to group the skin tone macroblocks together to form a contour, shown as block 100. As shown in the following figure, the center macroblock marked "X" will be classified as Skin tone macroblock even though it is not in the Skin tone macroblock candidate list.

Figure 8:
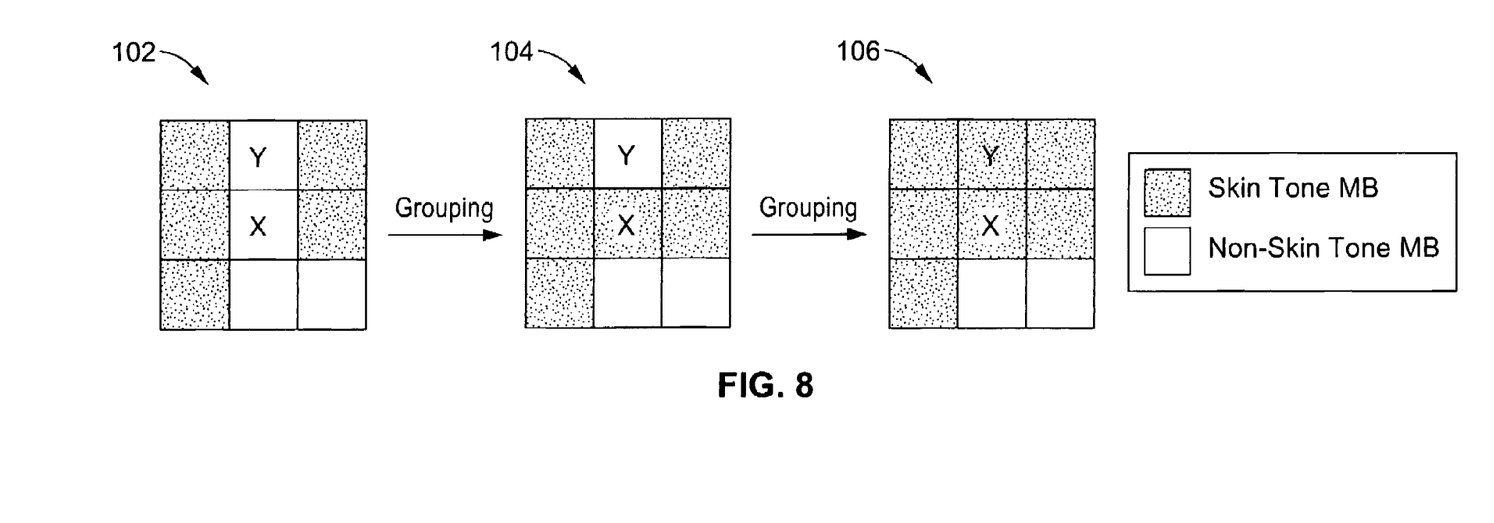
FIG. 8 shows a macroblock grouping process of the present invention.

The grouping operation is performed for each non-skin tone macroblock. Considering a macroblock X in FIG. 8, each macroblock is bordered by eight surrounding neighboring macroblocks in its original configuration, which are checked and counted. If the majority (e.g., 5 out of 8) of its neighboring macroblocks are detected to be skin tone, then X is changed from non-skin tone to skin tone. This newly added skin tone macroblock would affect the grouping result for the other non skin tone macroblocks. For example, in the original configuration 104, the macroblock Y is detected as non-skin tone since only 4 neighboring macroblocks are skin tone. The resulting configuration 104 after the first grouping now results in Y having 5 neighboring skin tone macroblocks. Therefore, after a second grouping 106, Y is also changed to be designated as skin tone. To eliminate the possibility of infinite loop of grouping operation, the maximum 3 iterations are imposed. The pseudo-code of the grouping operation is shown below:

```
for (k=0; k<3; k++) {
    iExtraMb = 0;
    for (each non SkinTone MB) {
        if (more than 5 out of its 8 neibhboring Mbs are SkinTone MB) {
            Change the current MB to a SkinTone MB;
            iExtraMb++; // newly added MB
        }
    }
    if (iExtraMb <= 0) { // no newly added MB
        break;
    }
}
```

Once human skin tone regions have been identified, the encoder can properly and more precisely improve this human skin area by, for example, decreasing Qp parameter. Because a region with human skin tone attracts more HVS (human vision system) attention in evaluating picture quality, the Qp parameter may be adjusted accordingly. In the video compression applications such as home videos, human skin tone such as human face is the major focus for viewers. This observation leads to the development of the proposed algorithm which to improve the viewing experience.

The skin detection algorithm may also be integrated with a MPEG/AVC encoder to improve over-all video quality, especially the handling of texture loss problem found in current video encoders. The skin-tone detection may be combined with the variance analysis for quality improvement. The basic idea is to properly change/decrease the Qp value in the Skintone MBs. The amount of Qp decreasing depends on its variance. Larger variance tends to smaller Qp decrease, while smaller variance tends to larger Qp decrease since variance in some sense represents the coding complexity.

Experimental Results

The results of the Skin Tone Detection Algorithm are shown in the following two tests. In the first test sequence illustrated in FIG. 9, the algorithm successfully identified the human face regions marked by white rectangles 110.

Figure 10:
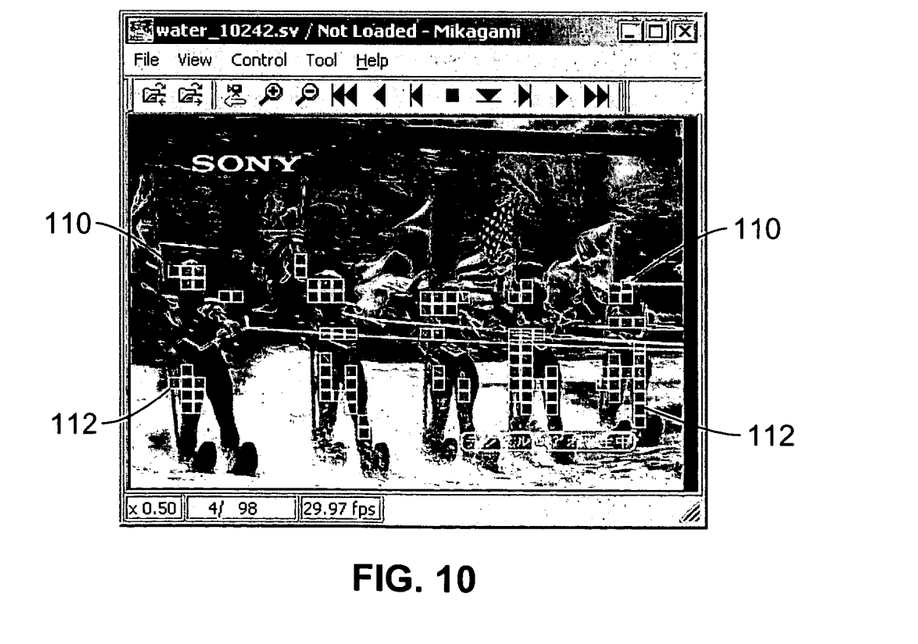
FIG. 10 illustrates test results of the skin tone detection algorithm on an image with multiple test subjects.

In the second sequence test sequence illustrated in FIG. 10, the algorithm again identified multiple human skin tone regions, identified human face regions 110 and other body regions 112. Note that additional processing such as shape analysis by be implemented to remove non-facial characteristics from the candidate list.

Figure 9:
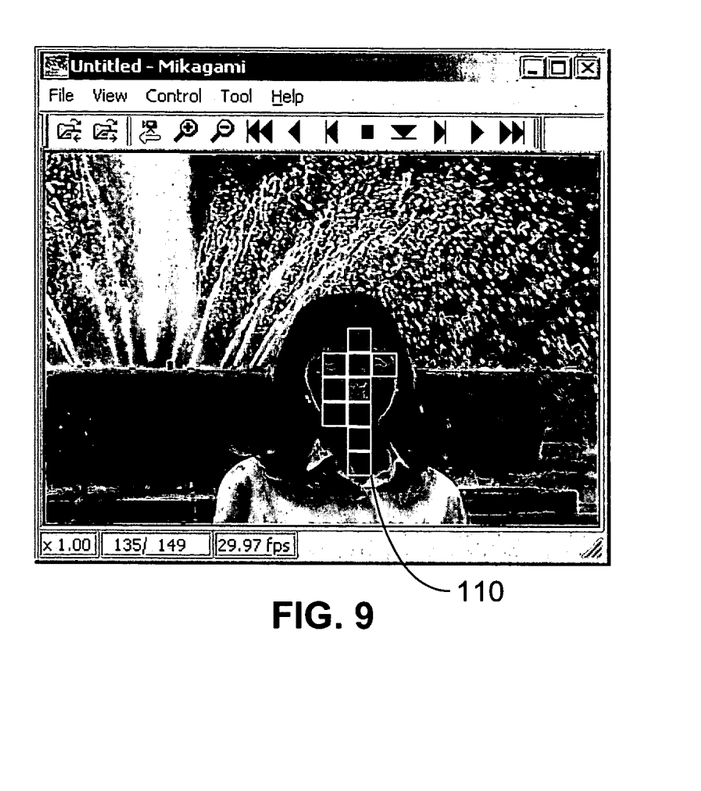
FIG. 9 illustrates test results of the skin tone detection algorithm on an image with a test subject.
Figure 11:
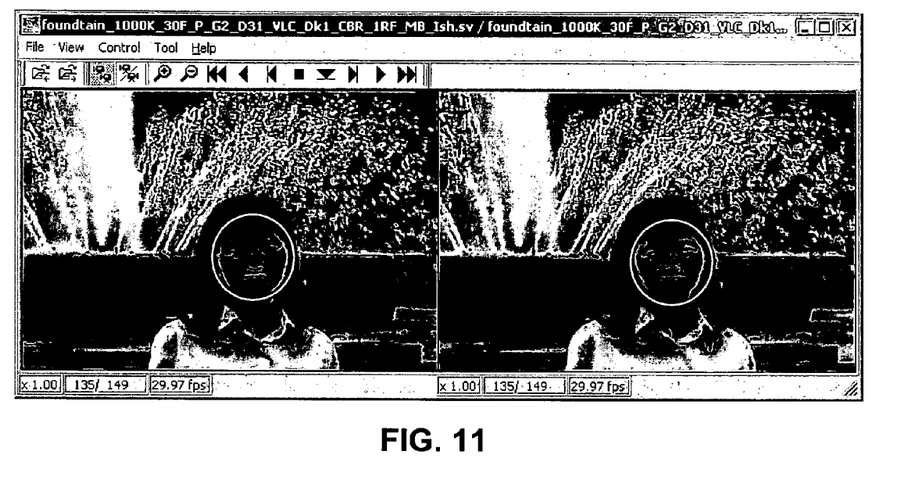
FIG. 11 illustrates test results of the skin tone detection algorithm combined with an encoder on the image of FIG. 9.

FIG. 11 illustrates the results of Skin Tone Detection Algorithm combined with an AVC encoder. In FIG. 11, the left hand side window shows the visual quality without human skin tone detection, while the right hand side window shows the visual quality by combining proposed human skin tone detection with variance based Qp decreasing. The proposed algorithm significantly improves the human face area. Note that the macroblocks with human skin tone are shown in FIG. 9.

Figure 12:
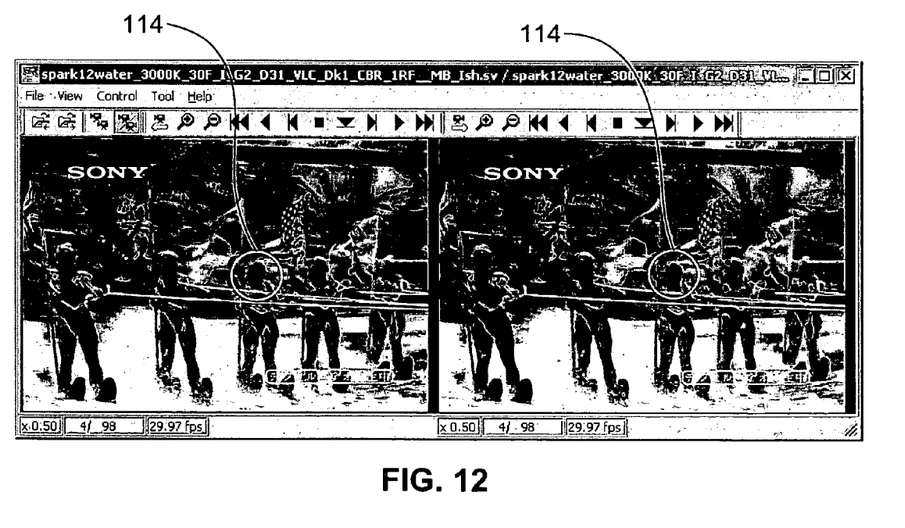
FIG. 12 illustrates test results of the skin tone detection algorithm combined with an encoder on the image of FIG. 10.

FIG. 12 shows another quality improvement by using the proposed human skin tone detection. In the encircled area 114 around the face region, the right hand side window uses the proposed algorithm and shows human face characteristics, while the left hand side window without skin tone detection suffers the loss of any definition in the human face. This distinction is especially prevalent when the comparison is made in viewing this comparison in commercial TV or professional video monitor.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method for detecting human skin tone in a video signal, the video signal comprising a plurality of frames each having image data, the method comprising:
    separating the image data for each frame into sets of data, the image data comprising a plurality of pixels each having a plurality of color components;
    averaging the image data in each data set to generate mean values for each color component in the data set;
    comparing the mean values to a stored color profile, the color profile correlating to human skin tone; and
    identifying data sets falling within the stored color profile.

2. A method as in claim 1, wherein generating a mean value for each component comprises generating Y, Cb, and Cr components in YCbCr color space.

3. A method as in claim 2, wherein separating the image data further comprises subdividing the image data into subsets, wherein each subset is averaged to generate mean values for each color component in the data subset.

4. A method as in claim 3, wherein separating the image data comprises subdividing the image data into four subsets.

5. A method as in claim 4, wherein each subset for the Cb and Cr components comprises a block of 4×4 pixels.

6. A method as in claim 4, wherein each subset for the Y component comprises a block of 8×8 pixels.

7. A method as in claim 4, wherein the mean values of each subset are compared to the stored color profile.

8. A method as in claim 7, wherein each subset is assigned a voting number to identify whether the subset falls within the stored color profile.

9. A method as in claim 8, wherein the subsets are summed to form a data set voting number.

10. A method as in claim 9, wherein the data set voting number is compared to a threshold number, and the data set is assigned to a skin tone candidate list when the data set voting number is greater than the threshold number.

11. A method as in claim 2, wherein the stored color profile comprises one or more color component ranges.

12. A method as in claim 11, wherein the color component ranges are acquired from a plurality of training sequences.

13. A method as in claim 11, wherein each color component range comprises a maximum and minimum value for each of the Y, Cb, and Cr components.

14. A method as in claim 1, further comprising assigning identified data sets to a skin tone candidate list.

15. A method as in claim 14, wherein the pixels in each data set in the candidate list are compared to the color profile, and wherein a data set having a total pixel count below a threshold number is removed from the candidate list.

16. A method as in claim 14, wherein the data sets in the candidate list that are not bordered by a threshold number of other data sets are removed from the list.

17. A method as in claim 14, further comprising supplementing the candidate list with data sets surrounded by data sets assigned to the candidate list.

18. An apparatus as in claim 14, further comprising means for filtering isolated macroblocks from the list.

19. An apparatus as in claim 14, further comprising means for supplementing the candidate list with macroblocks surrounded by macroblocks assigned to the candidate list.

20. A method as in claim 1, wherein the identified data sets are subjected to further processing by a video encoder.

21. An apparatus as in claim 1, wherein the identified macroblocks are subjected to further processing by a video encoder.

22. A method for detecting human skin tone in a video signal having a plurality of frames of image data, the method comprising:
   acquiring image data from a plurality of training sequences,
   generating a color profile from the plurality of training sequences, the color profile comprising one or more sets of component ranges indicative of human skin tone;
   comparing image data from each frame to the color profile; and
   identifying data sets from each frame that fall within the skin tone component ranges.

23. A method as in claim 22, wherein comparing image data comprises:
   separating the image data for each frame into sets of data;
   averaging the image data in each data set to generate mean values for each color component in the data set; and
   comparing the mean values of the data set against the color profile.

24. A method as in claim 23, wherein generating a mean value for each component comprises generating Y, Cb, and Cr components in YCbCr color space.

25. A method as in claim 24, wherein separating the image data further comprises subdividing the image data into subsets, wherein each subset is averaged to generate mean values for each color component in the data subset.

26. A method as in claim 24, wherein separating the image data comprises subdividing the image data into four subsets.

27. A method as in claim 24, wherein the mean values of each subset are compared to the stored color profile.

28. A method as in claim 27, wherein each subset is assigned a voting number if the subset falls within the stored color profile.

29. A method as in claim 28, wherein the subsets are summed to form a data set voting number.

30. A method as in claim 29, wherein the data set voting number is compared to a threshold number, and the data set is assigned to a skin tone candidate list when the data set voting number is greater than the threshold number.

31. A method as in claim 22, wherein each color component range comprises a maximum and minimum value for each of the Y, Cb, and Cr components.

32. A method as in claim 22, further comprising assigning identified data sets to a skin tone candidate list.

33. A method as in claim 32, wherein the candidate list data is refined by step 3.4.

34. A method as in claim 32, wherein the data sets in the candidate list that are not bordering any other data sets are removed from the list.

35. A method as in claim 32, further comprising supplementing the candidate list with data sets surrounded by data sets assigned to the candidate list.

36. A method as in claim 22, wherein the identified data sets are subjected to further processing by a video encoder.

37. An apparatus for detecting human skin tone in a video signal, the video signal comprising a sequence of video frames each having image data, the apparatus comprising:
   means for partitioning the image data into a plurality of macroblocks, each macroblock comprising a plurality of pixels each having a plurality of color components;
   means for averaging at least a portion of the data in each macroblock to generate mean values for each color component; and
   means for comparing the mean values to a stored color profile to identify macroblocks falling within the color profile, the color profile correlating to human skin tone.

38. An apparatus as in claim 37, wherein the plurality of components comprise Y, Cb, and Cr components in YCbCr color space.

39. An apparatus as in claim 38, wherein each macroblock further comprises a plurality of sub blocks, wherein each sub blocks is averaged to generate mean values for each color component in the sub block.

40. An apparatus as in claim 39, wherein each macroblock comprises four sub blocks.

41. An apparatus as in claim 40, wherein each sub block for the Cb and Cr components comprises a block of 4×4 pixels.

42. An apparatus as in claim 40, wherein each subset for the Y component comprises a block of 8×8 pixels.

43. An apparatus as in claim 37, wherein the stored color profile comprises one or more color component ranges.

44. An apparatus as in claim 43, wherein the color component ranges are acquired from a plurality of training sequences.

45. An apparatus as in claim 43, wherein each color component range comprises a maximum and minimum value for each of the Y, Cb, and Cr components.

46. An apparatus as in claim 37, further comprising means for assigning identified macroblocks to a skin tone candidate list.

47. An apparatus as in claim 46, further comprising means for filtering macroblocks having a pixel count below a threshold number from the candidate list.

* * * * *